(12) United States Patent
Meribout et al.

(10) Patent No.: US 11,971,282 B2
(45) Date of Patent: Apr. 30, 2024

(54) IMAGING SYSTEM FOR ANALYZING A MULTIPHASE FLOW BY MEASURING INDIVIDUAL FLOW RATES AND MEASURING DEPOSIT THICKNESS ON AN INTERNAL WALL OF A PIPE

(71) Applicants: Khalifa University of Science and Technology, Abu Dhabi (AE); Abu Dhabi National Oil Company, Abu Dhabi (AE)

(72) Inventors: Mahmoud Meribout, Abu Dhabi (AE); Esra Al Hosani, Abu Dhabi (AE)

(73) Assignees: Khalifa University of Science and Technology, Abu Dhabi (AE); Abu Dhabi National Oil Company, Abu Dhabi (AE)

( * ) Notice: Subject to any disclaimer, the term of this patent is extended or adjusted under 35 U.S.C. 154(b) by 599 days.

(21) Appl. No.: 17/268,045

(22) PCT Filed: Aug. 7, 2018

(86) PCT No.: PCT/IB2018/055945
§ 371 (c)(1),
(2) Date: Feb. 11, 2021

(87) PCT Pub. No.: WO2020/030947
PCT Pub. Date: Feb. 13, 2020

(65) Prior Publication Data
US 2022/0349738 A1    Nov. 3, 2022

(51) Int. Cl.
G01F 1/66 (2022.01)
G01F 1/663 (2022.01)
(Continued)

(52) U.S. Cl.
CPC ............ G01F 1/7082 (2013.01); G01F 1/663 (2013.01); G01F 1/704 (2013.01); G01F 1/74 (2013.01);
(Continued)

(58) Field of Classification Search
None
See application file for complete search history.

(56) References Cited

U.S. PATENT DOCUMENTS

| 5,485,743 A | 1/1996 | Taherian et al. |
| 6,502,465 B1 | 1/2003 | Vedapuri et al. |

(Continued)

FOREIGN PATENT DOCUMENTS

| AU | 4124097 A | 3/1998 |
| CA | 2240357 A | 7/1997 |

(Continued)

OTHER PUBLICATIONS

Australian Examination Report No. 1 for Standard Patent Application, issued for corresponding Australian Application No. 2018435824, dated Nov. 17, 2021.
(Continued)

Primary Examiner — Harshad R Patel
(74) Attorney, Agent, or Firm — Renner, Otto, Boisselle & Sklar, LLP

(57) ABSTRACT

An imaging system for measuring flow rates of the individual phases of a multiphase flow and for providing images of the multiphase flow, wherein the imaging system is adapted to also measure the thickness of deposits on the internal wall of a pipe, and to a method for analyzing a multiphase flow flowing through a pipe using the imaging system.

19 Claims, 13 Drawing Sheets

(51) Int. Cl.
   *G01F 1/704* (2006.01)
   *G01F 1/7082* (2022.01)
   *G01F 1/74* (2006.01)
   *G06T 7/00* (2017.01)
   *G06T 7/20* (2017.01)
   *H04N 23/90* (2023.01)
   *G01F 1/7086* (2022.01)
   *H04N 23/50* (2023.01)

(52) U.S. Cl.
   CPC ............ *G06T 7/0004* (2013.01); *G06T 7/20* (2013.01); *H04N 23/90* (2023.01); *G01F 1/7086* (2013.01); *G06T 2200/04* (2013.01); *G06T 2207/10072* (2013.01); *G06T 2207/10132* (2013.01); *H04N 23/555* (2023.01)

(56) References Cited

U.S. PATENT DOCUMENTS

| | | | |
|---|---|---|---|
| 6,857,323 | B1 | 2/2005 | Shajii et al. |
| 7,717,000 | B2 | 5/2010 | Xie et al. |
| 7,942,065 | B2 | 5/2011 | Xie |
| 9,541,435 | B2 | 1/2017 | Pors et al. |
| 9,612,145 | B2 | 4/2017 | Hurmuzlu et al. |
| 9,645,130 | B2 | 5/2017 | Xie et al. |
| 2008/0011101 | A1 | 1/2008 | Storm |
| 2009/0229375 | A1 | 9/2009 | Atkinson et al. |
| 2013/0222571 | A1* | 8/2013 | Kychakoff ............... G01J 11/00 348/82 |
| 2015/0253164 | A1* | 9/2015 | Kersey .................... G01F 1/704 73/861.08 |
| 2015/0276445 | A1 | 10/2015 | Black et al. |
| 2015/0316402 | A1 | 11/2015 | Wee et al. |
| 2015/0355115 | A1 | 12/2015 | Mustafina et al. |
| 2016/0161425 | A1 | 6/2016 | Berezin et al. |
| 2016/0231154 | A1 | 8/2016 | Barkin et al. |
| 2016/0258877 | A1 | 9/2016 | Al Hosani et al. |
| 2018/0058209 | A1* | 3/2018 | Song ......................... G01P 5/16 |
| 2018/0321068 | A1* | 11/2018 | Meribout ................ G01F 1/712 |
| 2021/0052173 | A1* | 2/2021 | Desjardins ........... A61B 5/0215 |

FOREIGN PATENT DOCUMENTS

| | | | |
|---|---|---|---|
| CN | 101441099 | 5/2009 | |
| DE | 102006017676 | 9/2007 | |
| GB | 2390683 A9 | 2/2004 | |
| GB | 2507368 | 4/2014 | |
| JP | 2014115164 A | 6/2014 | |
| WO | 9810249 | 3/1998 | |
| WO | 2013084183 A2 | 6/2013 | |
| WO | 2016027235 | 2/2016 | |
| WO | 2017021813 | 2/2017 | |
| WO | WO-2017021813 A2 * | 2/2017 | ............... G01F 1/66 |

OTHER PUBLICATIONS

Meribout, M., et al., "A New FPGA-Based Terahertz Imaging Device for Multiphase Flow Metering", IEEE Transactions on Terahertz Science and Technology, vol. 8, No. 4, May 17, 2018, pp. 418-426.

Goh, C. L., et al., "Ultrasonic Tomography System for Flow Monitoring: A Review", IEEE Sensors Journal, vol. 17, No. 17, Jul. 11, 2017, pp. 5382-5390.

Hosani, E. Al, et al., "A Limited Region Electrical Capacitance Tomography for Detection of Deposits in Pipelines", IEEE Sensors Journal, vol. 15, No. 11, Jul. 8, 2015, pp. 6089-6099.

Li, Yi, et al., "Gas/oil/water flow measurement by electrical capacitance tomography", Measurement Science and Technology, vol. 24, No. 7, Jun. 12, 2013, pp. 074001 (12pp).

Austrian Patent Office, International Search Report and Written Opinion for PCT/IB2018/055945, dated Oct. 9, 2018.

Dong F et al.: "Identification of Two-Phase Flow Regimes in Horizontal, Inclined and Vertical Pipes", Measurement Science and Technology, IOP, Bristol, GB, vol. 12, No. 8, Aug. 2001, pp. 1069-1075, XP001208975.

Supplementary European Search Report issued for corresponding EP Application No. 18929274.1, dated Feb. 15, 2022.

Communication pursuant to Article 94(3) EPC issued for corresponding European Patent Application No. 18929274.1, dated Aug. 23, 2023.

First Chinese Office Action issued for corresponding Chinese Patent Application No. 201880096497.8, dated Nov. 28, 2023.

\* cited by examiner

IMAGING SYSTEM FOR ANALYZING A MULTIPHASE FLOW BY MEASURING INDIVIDUAL FLOW RATES AND MEASURING DEPOSIT THICKNESS ON AN INTERNAL WALL OF A PIPE

This application is a national phase of International Application No. PCT/IB2018/055945, filed Aug. 7, 2018, which is hereby incorporated herein in its entirety.

FIELD OF THE INVENTION

The present invention relates to an imaging system for measuring flow rates of individual phases of a multiphase flow and for measuring the thickness of deposits on the internal wall of a pipe, and to a method for analyzing a multiphase flow and the thickness of deposits. The imaging system can be in particular used in the field oil recovery.

PRIOR ART

Accurate, non-invasive, non-intrusive, and real-time flow metering is required in various different applications. For instance, in biomedical field, measuring the flow rate of the blood inside the vessels is required to avoid unpredictable strokes which may occur from various cardio-vascular diseases.

In the field of oil and gas plants, it is required to ensure proper oil reservoir management and quality monitoring of the fuel being produced. This has led many researchers and companies to suggest and build various kinds of multiphase flow meters.

For instance, tomography systems which generate two dimensional (2D) and three dimensional (3D) images of the multiphase flow were extensively investigated, since they offer the possibility not only to accurately measure the multiphase flow, but also to visualize the type of actual flow regime, which helps to assess the quality of the design of the pipeline network under the actual flow conditions.

Currently, Electrical Capacitance Tomography (ECT), Magnetic Induction Tomography (MIT), Electrical Resistance Tomography (ERT), and Electrical Inductance Tomography (EIT) are the most commonly used systems for multiphase flow measurement. These systems mainly consist of an array of sensors (i.e. copper electrodes for ECT and EIT and coils for MIT) which are excited in a time multiplexed manner using a predefined sequence to collect electrical signals with features of which depend on the phases' distribution within the probe.

In spite of the outstanding progress achieved in both the hardware and algorithmic aspects, tomography systems have the problem to not properly cope with the boundaries between phases and also to require an excessive computation time. Modular systolic very-large-scale integration (VLSI) architectures were suggested to achieve a 2D ECT image reconstruction at high throughput (e.g. up to 1200 frames/second using Linear Back Propagation (LBP) algorithm with eight electrodes). While the availability of highly integrated VLSI chips allows a substantial reduction of the computation time, the quality of the output image is still affected by the smoothness constraint of the tomography algorithms. Another limitation of these systems is their disability to cope with small size phases, which is the case of wet gas flow where the droplets of water are dispersed and can be of sub mm-order size.

Other systems for multiphase flow measurement were also considered, such as the ones which allow to measure through the walls of the conduit using ultrasonic phased array sensors (e.g. U.S. Pat. No. 9,612,145). Such systems are applied for both blood flow measurement and oil-water and gas flow measurement. The devices consist of an array of emitting ultrasonic sensors, which are placed on one side of the pipe to transmit ultrasonic waves towards the other diametrically opposite side, which consists of another array of ultrasonic receivers, in a time multiplexed manner. An adequate analysis of the received signals allows to determine the multiphase flow composition as well as to reconstruct its corresponding 2D or 3D image. While this technique is accurate for multiphase flows composed of liquids only (i.e. oil and water), it is impractical for multiphase flows entrained with gas phase.

Another Near-Infrared (NIR)-based device has been suggested in the US patent application 2016/0258877. This device measures the flow of moving solid particles (e.g. black powder which are fine particles with high fraction of iron oxide and other chemical contaminants) across a conduit. The probe consists of an emitter source which transmits NIR waves in the range of 700 to 2500 nm inside the pipe segment. A set of NIR detectors receives NIR signals, the intensity of which depend on the size and concentration of the solid contaminants. While this technology has demonstrated its capability to detect accurately very small concentrations of solid contaminants with sub-mm size, it has not been assessed for oil-water-gas multiphase flow fluids.

In U.S. Pat. No. 5,485,743, an array of microwave antennas is suggested, which is arranged around the pipe to reconstruct the image of the flow using one of the tomography algorithms by capturing both the phase information which indicate the conductivity of the medium and the amplitude information which indicate the permittivity of the flow. Another similar apparatus was disclosed in U.S. Pat. Application US 2016/0161425 A1 where a multimode microwave cavity with plurality of feeds is suggested to determine the multiphase flow properties (i.e. water-cut) without image reconstruction. Another technique using y-rays was successfully used for multiphase flow measurements. However, in addition of being hazardous, y-rays-based probes do not perform well in case of high gas void fraction (i.e. GVF greater than 95%) and, also, they do not allow to obtain images of the flow.

U.S. Pat. No. 7,717,000 suggests a sampling method to reduce the complexity of measurements of the individual phases of multiphase flows. However, the method may not lead to the expected accuracy, since the fluid may likely lose both its physical and chemical properties. Furthermore, this method suggests to measure a fraction of a passing fluid which may not accurately represent the actual multiphase flow. Another significant drawback of this device is that the meter has moving parts which may lead to recurrent failures in the field.

WO2017/021813 suggests an imaging device for measuring flow rates of a multiphase flow having a high gas void fraction (GVF), i.e. wet gas application with a GVF higher than 95%, or having relatively low concentration of solid contaminants, e.g. black powder in gas pipelines. The device, however, cannot be used for applications with relatively low GVF or high water cut since THz waves get significantly damped with the increase of volume of high dielectric medium such as water, which is the case in many oil fields productions, and, moreover, it does not provide for an image of the flow.

U.S. Pat. No. 9,645,130 suggests a blind-tee junction for measuring multiphase flow properties such as the permittivity and/or conductivity of the flow in liquid rich regions using one RF electromagnetic sensors (one or several RF antennas) which operate in microwave range. However, the apparatus does not measure the individual flow velocities.

Furthermore, previous work suggested the use of a flow conditioner upstream the multiphase flow meter, however not for the purpose of generating a 2D or 3D image of the flow, but only for the purpose of facilitating the measurement of some characteristics of the flow such as the flow composition or the flow rate of its individual phases. Other meters, such as the one mentioned in U.S. Pat. No. 7,942, 065, use a microwave sensor, a gamma-ray sensor, in addition to a venturi meter. However, this system requires a radioactive element, and moreover, there is no indication of how the meter would perform in practice. Other hazardous multiphase flow meters using X-ray have also been disclosed (e.g. an X-ray apparatus as mentioned in U.S. Pat. Application Publication No. 2015/3355115 A1). Recently, nuclear magnetic resonance-based multiphase flow meters were suggested. For instance, the meter disclosed in U.S. Pat. No. 9,541,435 consists of two sets of permanent magnets. However, the technology is still in the prototype phase and further field work is required to prove the concept.

Thus, there is still a need to develop a new concept of multiphase flow metering which can provide not only information about the flow rates of each individual phase but also an image of the flow. An additional challenge of multiphase flow meters is to compensate for eventual build-ups of contaminants (e.g. scale composed of crude oil and/or black powder) which may accumulate on the internal wall of a pipe. This is a real existing challenge which has been rarely tackled by manufacturers of multiphase flow meters. In this regard, a highly complex mechanical apparatus consisting of three pressure sensors is suggested in WO 98/10249. A similar concept with the additional use of electromagnetic sensor was suggested in U.S. Pat. Application Publication No. 2015/316402.

BRIEF DESCRIPTION OF THE INVENTION

The present invention solves the above-mentioned disadvantages of the prior art by providing an imaging system for measuring flow rates of the individual phases of a multiphase flow, wherein the imaging system is adapted to also measure the thickness of deposits on the internal wall of a pipe.

The multiphase flow may comprise at least a gaseous phase and a liquid phase, and wherein the liquid phase comprises water and/or oil. For example, the multiphase flow can be a wet gas.

The imaging system may further comprise an online flow conditioner. An online flow conditioner can in particular improve the signal to noise ratio of the image signal.

The online flow conditioner may generate annular flow or stratified flow. Such flow generation reduced the overall computational effort to analyze the multiphase flow.

The online flow conditioner may be a swirl separator or cyclone separator.

The online flow conditioner may be positioned upstream of the imaging system.

The imaging system may comprise a THz imaging system, an ultrasonic array imaging system, an electrical capacitance tomography system, an electrical resistance tomography system and/or a magnetic inductance tomography system.

The imaging system according to the present invention does not use any statistical approach but relies on physical data captured from various imaging sensors that either include one or more THz cameras, an ultrasonic array sensor (and accompanying hardware), an electrical capacitance tomography system, an electrical resistance tomography system and/or a magnetic inductance tomography system. While the THz imaging system is in particular useful for analysis of high GVF with low water-cut, the ultrasonic array imaging system can be predominantly used for low GVF and high water-cut. The THz imaging system depends on the differential absorption in media with different dielectric constants. For example, water has a dielectric constant of more than 80, while the dielectric value of gas is around 1.

The imaging system may in particular comprise a THz imaging system and an ultrasonic array imaging system, wherein the THz imaging system is adapted to measure multiphase flows of gas void fractions above a predefined value, and wherein the ultrasonic array imaging system is adapted to measure multiphase flows of gas void fractions below the predefined value.

Such arrangement allows that flow can be measured for both high and low GVF conditions and high and low water-cut conditions.

The ultrasonic array imaging system may operate in echo mode, transit time mode or Doppler-effect mode. The ultrasonic array system is suitable for conditions of multiphase flows having a dielectric constant higher than 1.

The imaging system may further comprise one or more pairs of ultrasonic sensors which operate in transit time mode and/or Doppler-effect mode adapted to measure the flow rates of the multiphase flow, wherein the one or more pairs of ultrasonic sensors are adapted to be inserted into the multiphase flow. Thereby, the ultrasonic waves propagate through the liquid.

The pair of ultrasonic sensors may be liquid ultrasonic sensors when the flow downstream of the flow conditioner is an annular flow.

When the flow downstream of the flow condition is a stratified flow, pairs of liquid ultrasonic sensors may be used in transmit mode to measure the liquid velocity, and pairs of air ultrasonic sensors may be used in transmit mode to measure the gas velocity.

The ultrasonic array imaging system may be arranged as a circular array. Such circular array is used to obtain an image of the flow, e.g. in case of an annular flow an image of the outer liquid layer.

The imaging system may further comprise at least one temperature sensor, and/or at least one pressure sensor.

The at least one pair of ultrasonic sensors may be arranged such that in operation, the ultrasonic waves propagate through the liquid.

The THz imaging system may comprise an THz source and a THz camera, which capture a THz image reflecting the permittivity of the multiphase flow within the vicinity of the THz camera.

The THz image may be processed by performing block-based motion estimation or region-based motion estimation to provide an image of the multiphase flow, the GVF, the water-cut, the density, and/or the velocity of the liquid-gas interface, which is the average between the gas velocity and the liquid velocity.

The THz imaging system may comprise two or more THz cameras and/or two or more THz sources adapted to perform three-dimensional reconstruction of the multiphase flow and/or to perform an accurate two-dimensional image reconstruction.

The at least one THz camera comprises one or more pixels. In case the THz camera comprises one pixel, the camera operates as one THz detector. Alternatively, the THz camera may comprise up to thousands of pixels. In general, the quality of the image increases with the number of pixels.

The THz imaging system may work at frequencies of between 0.1 THz and 10 THz (corresponding to wavelengths of 30 μm to 3 mm and energies of 0.41 to 41 meV). However, the present invention can be worked at frequencies below or above this range.

The ultrasonic array imaging system may comprise one ultrasonic element or up to thousands of ultrasonic elements.

The ultrasonic array imaging system may comprise one or more rings of ultrasonic elements, wherein the ultrasonic array imaging system operates in transit and/or reflection mode adapted to determine the thickness of the gas phase and the water-cut value, and to perform image reconstruction using a tomography technique.

The ultrasonic array imaging system may operate at frequencies of between 1 KHz and 100 MHz.

The present invention is also directed to the use of the imaging system for measuring flow rates of a multiphase flow and for visualizing the flow of the multiphase flow, and/or for measuring the thickness of deposits on the internal wall of a pipe.

The multiphase flow may have a low gas void fraction and/or a high water-cut.

The present invention is also directed to a method for analyzing a multiphase flow flowing through a pipe using the imaging system, comprising the steps of
- determining the flow rates of the individual phases of the multiphase flow;
- acquiring a two-dimensional or three-dimensional image of the flow of the multiphase flow; and
- preferably, measuring the thickness of scale which is deposited at the internal wall of the pipe.

The flow rates may be determined using a block based motion estimation algorithm based on the data obtained from the THz imaging system and/or from the ultrasonic array imaging system.

The multiphase flow may comprise at least a gaseous phase and a liquid phase, and wherein the liquid phase comprises water and/or oil.

The pipe can be a gas or oil pipeline.

The THz imaging system can be placed such that the THz cameras are arranged in parallel in the direction of flow.

In addition of providing the flow regime of the actual flow, the suggested system has the advantage to accurately estimate the amount of deposits which may build-up on the wall of the pipe. This deposition issue has been rarely considered in other multiphase flow meters, but is a real practical problem to conduct accurate flow measurements.

BRIEF DESCRIPTION OF THE DRAWINGS

In the following preferred embodiments of the invention are described by reference to the drawings in which shows.

DETAILED DESCRIPTION OF THE INVENTION

Figure 1:
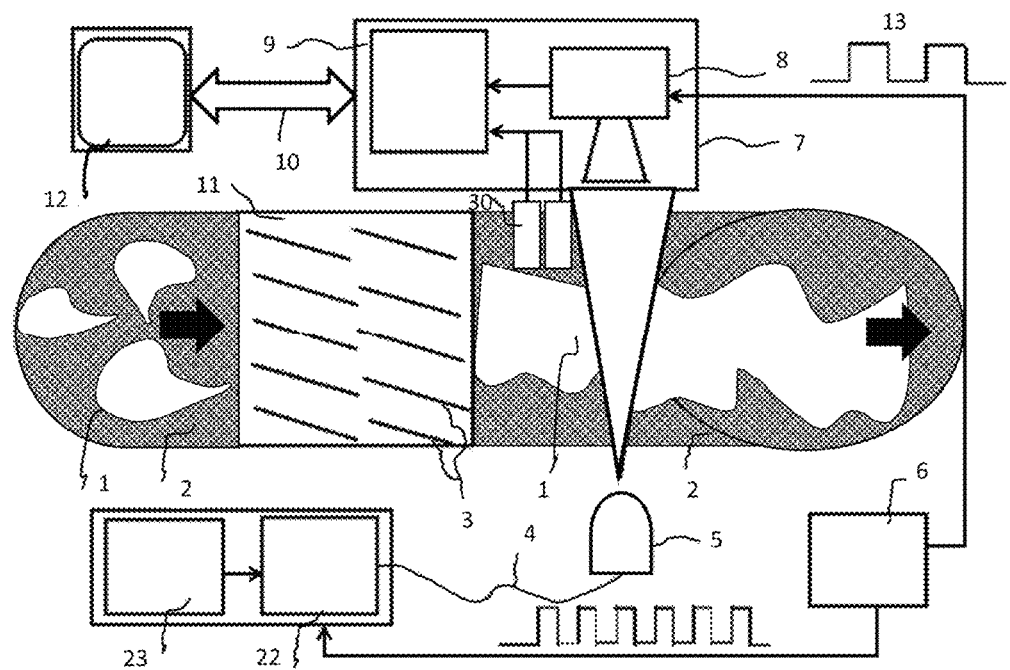
FIG. 1: an illustration of an imaging system according to an embodiment of the present invention.

In the following, preferred embodiments of the invention are described in detail with respect to the accompanying figures. It is, however, understood, that these embodiments are not meant to limit the application and scope or configuration of the disclosure. On the other hand, the following description of the invention can provide to those skilled in the art other exemplary preferred embodiments. It is understood that various changes can be made without departing from the concept and scope as set in the appended claims.

The present invention relates to a compact imaging system for multiphase flow metering, which can be also used for the measurement of scale thickness, i.e. the thickness of scale which is deposited at the internal wall of the pipe. The imaging system may, for example, comprise a THz imaging system and/or an ultrasonic array system. It may also include other sets of additional sensors such as ultrasonic sensors to determine the flow rates of individual phases. Depending on the flow conditions, the imaging system may also comprise an upstream online flow conditioner to generate a suitable flow regime such as an annular flow (using a swirl separator) or a stratified flow which can be more easily processed by the imaging system. The imaging system can also work autonomously, without a flow conditioner, in case the overall dielectric value of the multiphase flow does not exceed a predefined value. For instance, in case of multiphase flow with very high gas void fraction (GVF) or a multiphase flow with relatively low water-cut, the usage of a THz imaging system to determine the individual flow rates is appropriate. Alternatively, in case of very low GVF the ultrasonic array imaging system can be used.

According to one embodiment, the invention relates to an imaging system which may comprise a THz imaging system which consists of a THz camera, a THz source, and associated electronics to measure individual flow rates of the multiphase flow and to visualize the flow. The THz camera can comprise a two-dimensional array of pixels, where each pixel is associated to a color value coded in a predefined number of bits (e.g. 8, 12, 16, or 24 bits) and represents the amplitude of the THz wave transmitted through the target under test (TUT) medium. The two-dimensional pixel array can be as small as 1×1 pixels and as large as thousands of pixels. The physical principal of the meter is based on the fact that THz waves propagation in a given medium depends on several physical parameters such as its dielectric value and size. In case of a multiphase flow comprising oil, water, and gas, water phase has a relative dielectric value which can exceed 80, while the one of the gas is usually around unity. Consequently, THz radiations are more absorbed in the water phase than in the gas phase. Depending on the design of the imaging system, a two-dimensional or three-dimensional image of the multiphase flow can then be achieved in real-time using a dedicated hardware machine.

The imaging system can also contain an additional ultrasonic array imaging system which can operate either in echo mode, transit time mode, or Doppler-effect mode. This device is complementary to the THz imaging system to handle for instance scenarios of multiphase flows of very low GVFs and high water-cut. The device may also comprise an online flow conditioner to generate either annular flow, using swirl cage, or stratified flow. While compact and efficient online separators are available, these two flows are easier to acquire and process by the two aforementioned imaging systems.

In addition to the two imaging systems and flow conditioners, the apparatus may also comprise other sensors. For instance, ultrasonic sensors can be used to determine the gas flow rate in case the multiphase flow fluid comprises only dry gas or relatively very small concentration of liquid or that the conditioned flow downstream the separator is relatively uniform and does not significantly change over time. Temperature sensors can also be included to compensate for eventual offsets caused by the temperature variations.

The advantage of the suggested imaging system is that in addition of being non-invasive and non-intrusive, the system can provide an image of the flow and can easily handle cases which are hardly tackled in today's multiphase flow meters such as high GVF (e.g. GVF>95%) and very high water-cut.

Moreover, the system according to the present invention does not use any statistical approach but relies on physical data captured from various imaging sensors that include THz camera(s) and ultrasonic array sensor(s) (and accompanying hardware). Moreover, an online flow conditioner is suggested in order to improve the signal to noise ratio of the image signal. In addition of providing the flow regime of the actual flow, the suggested system has the advantage to accurately estimate the amount of deposits which may build-up on the wall of the probe. Oilfield scale deposits is an issue which has been rarely considered in other multiphase flow meters but it is a real practical problem to conduct accurate measurements.

As illustrated in FIG. 1, according to one embodiment of the present invention, the imaging system comprises a THz imaging system combined with an upstream swirl valve and its interface with the control room. The imaging system comprises a THz camera 8 which captures THz radiations sent from a THz source 5 after they propagate through a multiphase flow medium comprising liquid phase (e.g. oil-water mixture) 2 and gas phase 1.

The THz frequency range, named also sub-millimeter wave band, refers to frequencies above 0.1 THz and below 10 THz (which corresponds to wavelengths from 30 µm to 3 mm and energies from 0.41 to 41 meV), nevertheless other frequencies below and above this range can be also used according to the present invention. Selecting the operating frequency and the power of transmission depends on various factors such as the range of water-cut, the range of the gas void fraction (GVF), and the zone classification where the device will be deployed. Both the THz camera 8 and the THz source 5 (and eventually lenses which are either embedded into the camera and/or the source of light or used as separate components to set an adequate field view) are placed in front of each other to enclose the pipeline which carries the multiphase flow. Upstream to the THz imaging system, an online flow conditioner, consisting for instance of a swirl cage 11 comprising several slots 3 which are oriented according to a predefined orientation angle and through which the multiphase flow pass through. Downstream, a multiphase flow with a certain flow regime can be created (e.g. annular flow consisting of liquid phase as the outer layer and the gas phase as the inner layer). This design has the advantage to simplify the computation complexity of the imaging system, while it causes a relatively negligible pressure drop. A transmitter 9 performs image capture and processing at video frame rate in order to determine the flow rates of individual flows composing the flow, as well as to reproduce an image of the flow. A differential pressure sensor 30 can also be used to measure the static pressure at a given section of the probe but within the vicinity of the THz camera in order to estimate the gas flow rate and the liquid flow rates using for instance the simplified momentum equation, in addition to the one estimated by the THz imaging system:

$$-\frac{dp}{dz} = \frac{\tau_0 P}{S} + \dot{m}^2 \frac{d}{dz}\left[\frac{(1-x)^2}{\rho_L(1-\varepsilon_G)} + \frac{x^2}{\rho_G \varepsilon_G}\right] + g\rho_{TP}\sin\alpha \quad \text{(Equation 1)}$$

where $\varepsilon_G$ is the void fraction, dp/dz the measured differential pressure along a given axial distance, z the axial distance, g the acceleration due to the gravity, $\rho_G$ the gas density, $\rho_L$ the liquid density, $\tau_0$ the wall shear stress, S the pipe cross sectional area, P the pipe periphery, $\alpha$ the angle of inclination of the pressure sensor to the horizontal (e.g. 90° in FIG. 1) and $\rho_{TP}$ is given by:

$$\rho_{TP} = (1-\varepsilon_G)\rho_L + \varepsilon_G \rho_G \quad \text{(Equation 2)}$$

The three terms on the right-hand side of Equation 1 denote respectively the frictional, acceleration, and gravitational pressure gradient terms. Using Equation 1, the variable $\dot{m}$ which represents the mass flux of the mixture can be determined and consequently a second relationship between the gas velocity and liquid velocity can be obtained.

In a preferred embodiment, the communication between the THz source light 5 and the drive circuit logic 22 is done using optical fiber 4 as the communication medium. This is convenient if the process to be measured is hazardous and can only host intrinsically safe instruments. The system according to FIG. 1 further comprises a display device 12, a clock generator logic 6, and a pulse power source 23. This is required for pulsed light emission. Nevertheless, the system can also operate in continuous mode in which THz light is permanently emitted. In this case, the clock generator logic block is not required. However, in practice, the pulsed mode has the advantage to compensate for the noise radiations which may be emitted by various objects (i.e. objects having a temperature ranging from 14 to 140 K). In this case, the image acquisition module proceeds to continuously subtract consecutive frames obtained with and without THz radiation. Not represented in FIG. 1 is a phase compensation circuit, implemented in the image processing module 7 to compensate for the eventual phase shift caused by the THz camera.

Even though FIG. 1 illustrates a preferred embodiment where the system configuration is in the absorption mode, the present invention also expands to the reflection and refractions modes as well. This may be more appropriate in case of a higher a multiphase flow with high water-cut.

One of the main tasks of the image processing module 9 is to perform block-based or region-based motion estimation on the acquired images which can be either in a two-dimensional space by using a single THz camera or in three-dimensional space, if more than one camera are used. In addition, both the dielectric and densities of the liquid and gas phases can be determined from those images by running some pattern recognition algorithm in the image processing module 9. For instance, it is expected that the pixel value, which is typically coded in 8, 12, or 16 bits for THz cameras, is highly linearly dependent on the dielectric value of the corresponding medium. Also, the density of both gas and liquid phases has to some extent an effect on the pixel values (but not as much as the dielectric value). The motion fields of the liquid-gas interface which is created downstream the flow conditioner as well as the dielectric and density values of both the gas and liquid phases will be used to determine the individual flow rates of the liquid droplets and the gas.

A differential pressure sensor 30 can also contribute to the measurement of the gas and liquid velocities using the simplified momentum equation (Equation 1). This information may be transmitted to a remote computer or remote Programmable Logic controller (PLC) via a standard bus 10 (i.e. 4-20 mA bus or field bus network).

Prior to perform the motion estimation algorithm, the data acquisition module 9 may perform image binarization using dynamic thresholding technique, followed by image morphology (e.g. erosion and dilation of regions corresponding to liquid bubbles).

It shall be appreciated that the permittivity of the mixed medium, $\varepsilon_{mix}$, affects both the attenuation and the mixed velocity, $V_{mix}$, of the THz waves according to the following equation:

$$V_{mix} = \frac{c}{\sqrt{\varepsilon_{mix}}} \quad \text{(Equation 3)}$$

wherein c is the sound speed (equal to $3*10^8$ m/s). In case the fluid consists of three phases, $\alpha_1$ (water), $\alpha_2$ (oil), and $\alpha_3$ (gas), then the above equation can be rewritten as follows:

$$V_{mix} = \frac{c}{\sum_{i=1}^{3} \alpha_i \sqrt{\varepsilon_i}} \quad \text{(Equation 4)}$$

wherein $\varepsilon_1$, $\varepsilon_2$, and $\varepsilon_3$ are the relative permittivity of the water, oil, and gas respectively, which are variables and range in the intervals [60, 80], [2, 5], and [1, 1.15] respectively. Assuming a realistic case that the permittivity of air is almost constant, and that the fluid consists of only water and gas (which is a typical case in wet gas fluid) would lead to determine the following air fraction:

$$\alpha_3 = \frac{\sqrt{\varepsilon_1} - \sqrt{\varepsilon_{mix}}}{\sqrt{\varepsilon_1} - \sqrt{\varepsilon_3}} \quad \text{(Equation 5)}$$

$\varepsilon_{mix}$ can be determined using Equation 1 above, for which $V_{mix}$ is the average velocity of the THz waves over all the pixels of the image. This data can be used to correct the data extracted from the THz camera which may provide some uncertainties because of the two-dimensional nature of the acquired images.

It should be appreciated that most or some of the logic in the image processing unit 7 to measure the flow rate and gas/liquid fraction from the acquired THZ images may be performed either in software using one or several central processing units or in hardware using logic gates based ICs such as Field Programmable arrays.

Figure 2:
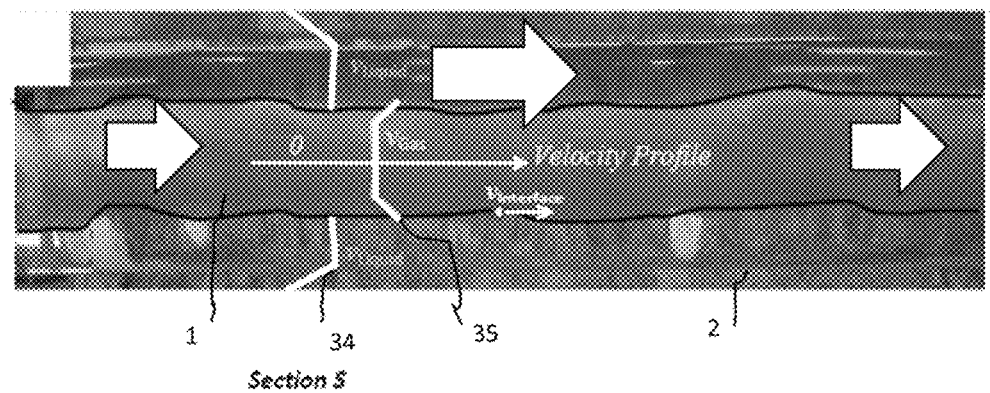
FIG. 2: a real image of an annular flow captured downstream of a swirl separator according to an embodiment of the present invention.

FIG. 2 shows a real image of an annular flow captured downstream a swirl separator where the gas phase 1 is surrounded with liquid phase 2.

The fact that the boundary of the liquid-gas interface is not a straight line but rather wavy to some extent can be explored in the image processing part to estimate the motion vector of this interface, $v_{interface}$, which can be estimated as the average velocity between the average liquid velocity $v_{liquid}$ 34 and the average gas velocity, $v_{Gas}$ 35.

$$v_{interface}=(v_{interface}+v_{interface})/2 \quad \text{(Equation 6)}$$

FIG. 2, which shows the velocity profiles of the liquid 34 and gas 35 at section S of the pipe, shows the skip velocity between gas and liquid phases is not null.

Figure 3:
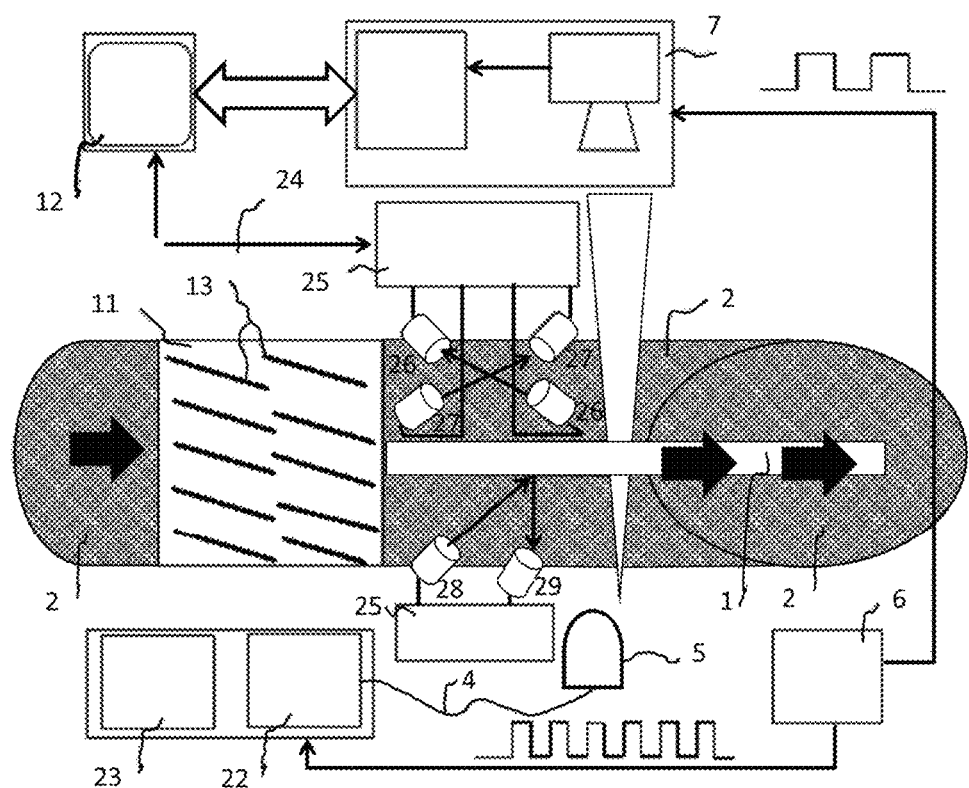
FIG. 3: an illustration of an imaging system according to a further embodiment of the present invention.

FIG. 3 shows another preferred embodiment of the present invention, according to which the imaging system comprises a THz imaging system and a set of liquid ultrasonic sensors 26, 27, 28, and 29 in order to measure the flow rate of both the liquid and gas. The system also comprises a flow conditioner, e.g. a swirl valve. The pairs of ultrasonic sensors are adequate for measuring the velocities of both liquid phase and gas phase in an accurate manner, or when the downstream flow is relatively uniform and hence the motion estimation technique cannot be applied on the acquired image.

The liquid flow rate is determined using the two pairs of ultrasonic sensors 26 and 27 which emit an upstream ultrasonic wave and a downstream wave respectively, the time delays of which are given by the following expression:

$$T_{Upstream}=2d/(v-v_{Liquid}) \quad \text{(Equation 7)}$$

$$T_{Downstream}=2d/(v+v_{Liquid}) \quad \text{(Equation 8)}$$

where d is the distance between the two ultrasonic sensors of each pair, v the propagation speed of the ultrasonic wave into the liquid phase, and $v_{Liquid}$ is the unknown liquid velocity. The variable, v, which depends on the water-cut can be determined using the THz camera. Using the above equations (7) and (8), the liquid velocity can be determined as follows:

$$v_{Liquid}=(T_{Upstream}-T_{Downstream})*v^2/(2d) \quad \text{(Equation 9)}$$

The gas velocity, $v_{Gas}$, can be determined using the other pair of ultrasonic sensors 28 and 29 which operate in Doppler mode:

$$v_{Gas}=a(f_t-f_r)/(2f_t \cos \theta) \quad \text{(Equation 10)}$$

where $f_t$ is frequency of the transmitted ultrasonic wave, $f_r$ the frequency of the received ultrasonic waves, and $\theta$ the half angle between the two sensors.

Figure 4:
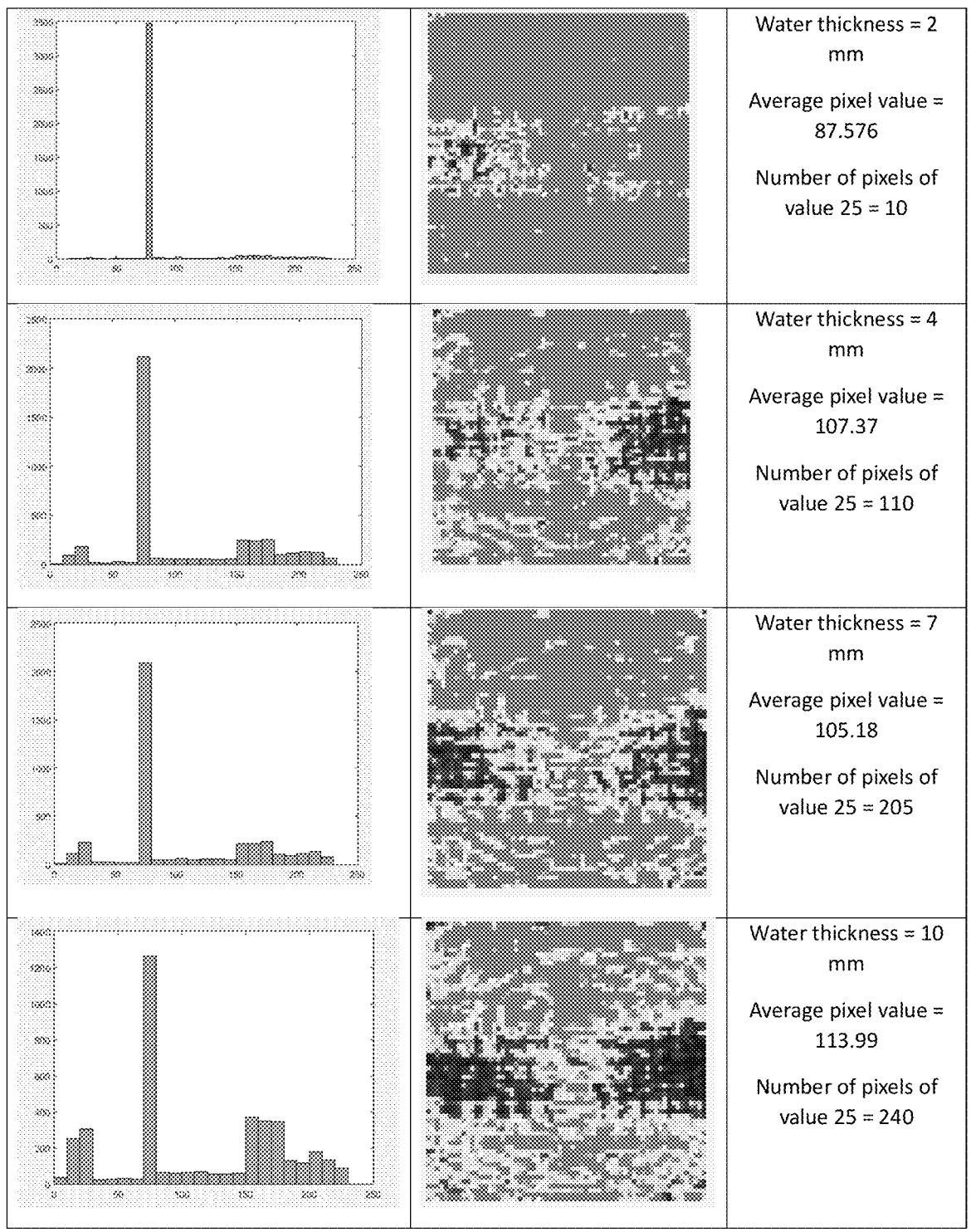
FIG. 4: images of a flow captured by a THz camera, corresponding histograms plots and statistical data according to a further embodiment of the present invention.

FIG. 4 shows images of the flow captures by a THz camera for various thicknesses of the liquid layer (i00% water-cut in this case) and the corresponding histogram plots and statistical data. While different features can be used to determine the liquid-gas ratio, the feature in the histogram which consists to count the number of pixels having a value around 25 showed a consistent trend since it increases with the increase of thickness. It is worth noting that with the increase of liquid thickness, there is an increase of refractions around the liquid layer. This effect can be reduced by reducing the intensity of exposure of the THz source.

Figure 5A:
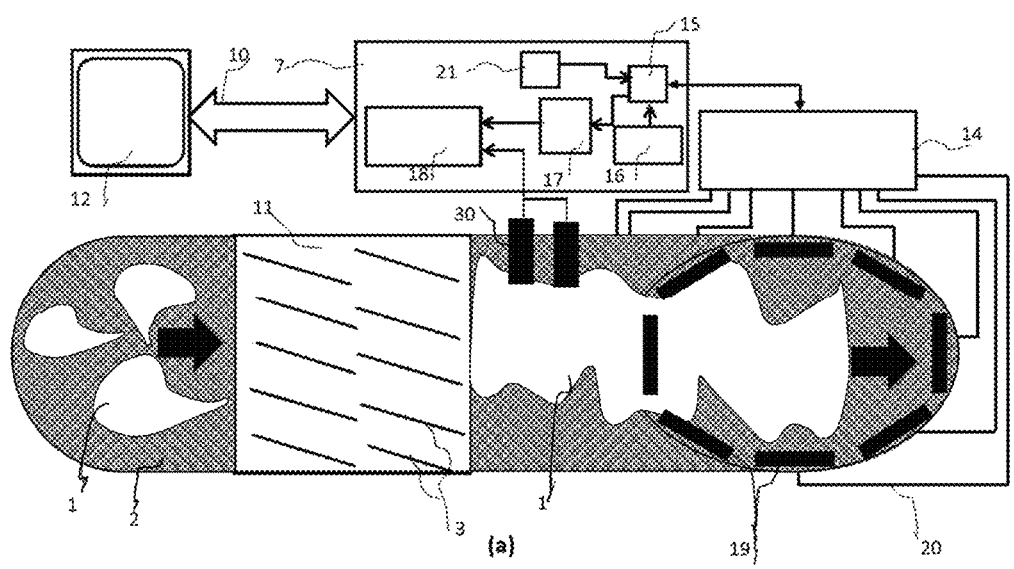
FIG. 5a, b: a schematic longitudinal illustration (a) and cross-sectional illustration (b) of an imaging system according to a further embodiment of the present invention.

FIG. 5(a) shows another preferred embodiment of the present invention, an imaging system comprising an array of ultrasonic array probe 19 which is placed downstream of the flow conditioner 11, e.g. a swirl valve. The system is inserted into a pipeline carrying a multiphase flow and it is interfaced with the control room. The probe which may consist of one (as shown in FIG. 5(a)) or more rings of ultrasonic arrays can be preferred to the one shown in FIG. 1 when the value of the water-cut exceeds a predetermined value (e.g. 50% water-cut) since most of THz waves are absorbed in this range. However, the probe can also operate in case of low water-cut as well but would deliver an image of less quality than the one provided by the THz camera since the reconstruction algorithm which is usually based on tomography technique does not perform well in the liquid-gas interface region. The probe consists of an array of ultrasonic elements 19 which can be as small as less than 10 ultrasonic elements and as large as thousands of ultrasonic elements. These elements are triggered by the pulser module 21 in a time multiplexed manner through a multiplexer/demultiplexer module 14 which selects the probe element to be activated. A fast analog switch 15 configures the device from emitting mode to a receiving mode to carry the received signal to an amplifier 17 and the digital main processing unit 18. Without loss of generality, the ultrasonic array imaging probe 19 can be substituted with electrodes or coils to perform either Electrical Capacitance Tomography (ECT), Electrical Resistance Tomography (ERT), or Magnetic Inductance Tomography (MIT). The associated electronics 21, 14, 15, 17, and 18 need to be modified accordingly. The system according to FIG. 5(a) further comprises a display device 12.

Figure 5B:
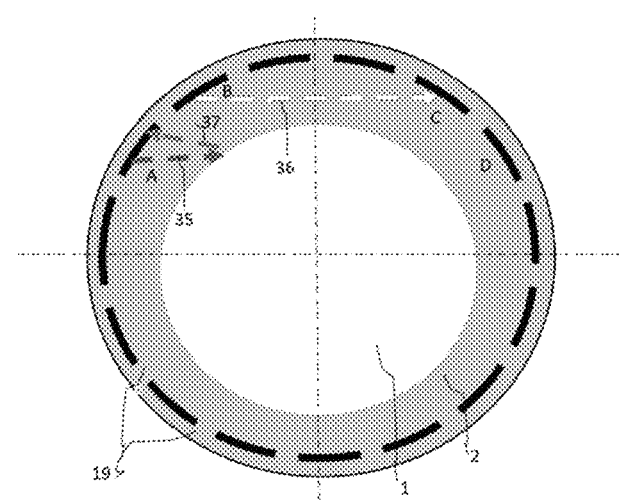

FIG. 5(b) shows the cross section of the ultrasonic array imaging system as depicted in FIG. 5(a). In addition of using ultrasonic tomography algorithm to build up the image of the flow, the image also illustrates an accurate way to determine the thickness of the liquid layer as well as the water-cut. Hence, the ultrasonic element A emits an ultrasonic wave 35 towards the sensor element D. The wave will not hit the element D because of the gap of air between both sensors. In another time slot, the ultrasonic element C receives an ultrasonic wave 36 emitted by the element B which indicates the existence of the liquid layer between the two devices. These two sequences allow to estimate the thickness of the liquid layer. The water-cut of the liquid can be determined by exploring the echo signal 37 since for a given depth, the time of flight of the ultrasonic wave is proportional to the water-cut. This way, the ultrasonic array imaging device needs to operate in both transit time mode and reflection mode.

Figure 6:
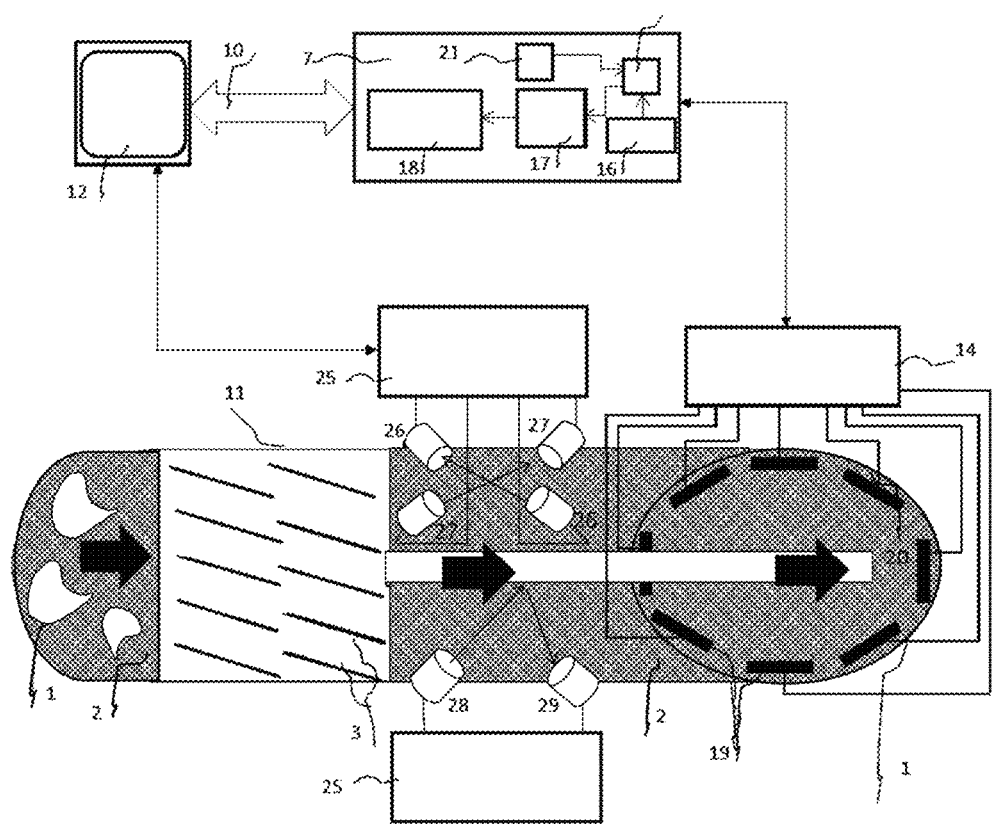
FIG. 6: a schematic illustration of an imaging system according to a further embodiment of the present invention.

FIG. 6 shows another preferred embodiment of an imaging system according to the present invention, which differs from the one shown in FIG. 5(a) by substituting the pressure sensor with a set of liquid ultrasonic sensors 26, 27, 28, and 29 in order to measure the flow rate of both the liquid and gas. Accordingly, the system comprises an ultrasonic array imaging device, a flow conditioner, such as swirl valve, pairs of ultrasonic sensors and its interface with the control room. As explained above, the pairs of ultrasonic sensors are adequate for measuring the velocities of both liquid phase and gas phase in an accurate manner, or when the downstream flow is relatively uniform and hence the motion estimation technique cannot be applied on the acquired image. The liquid flow rate is determined using the two pair of ultrasonic sensors 26 and 27 which emit an upstream ultrasonic wave and a downstream wave respectively. The gas velocity is determined using the pair of sensors 28 and 29 which operate in Doppler effect mode.

Figure 7:
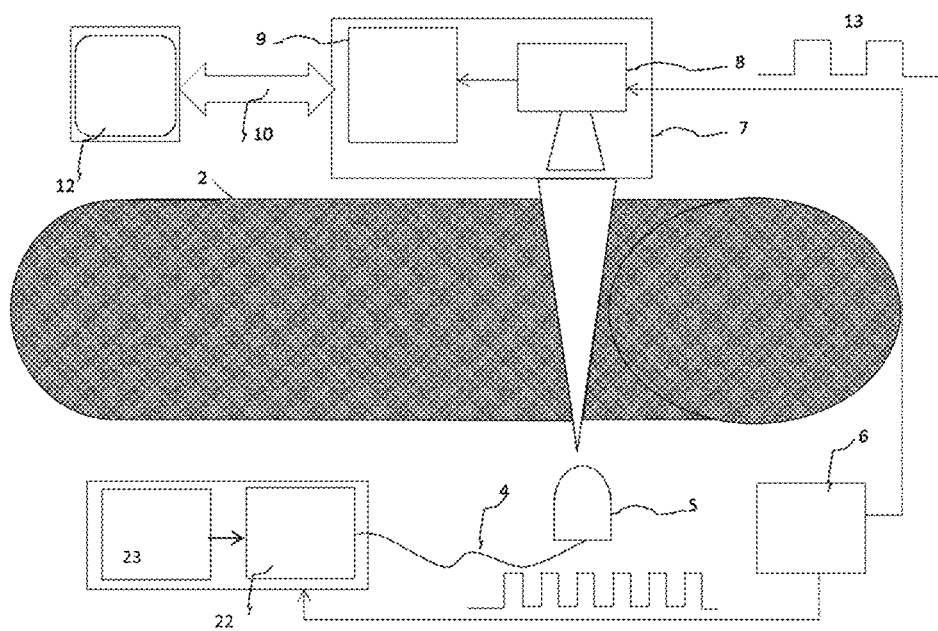
FIG. 7: a schematic illustration of an imaging system according to a further embodiment of the present invention.

FIG. 7 shows another embodiment of the invention, according to which the imaging system comprises a THz imaging device, inserted into a pipeline carrying a multiphase flow. In this embodiment, a flow conditioner is not required in the imaging system. Such arrangement may be adequate in case when the multiphase flow meter is placed along a vertical pipe within which (and similarly to the flow downstream the liquid-gas separator shown in FIG. 1) the gas phase which is the dominant phase usually travels along the center of the pipe with dispersed oil and water within it, while the majority of the oil and water travel along the pipe wall. This may be adequate in case of very high GVF, where the quality of liquid-gas separation may not be efficient or for relatively very low water-cut. In case of very high GVF, the liquid droplets which are entrained in the gas have almost the same velocity as the gas phase in case the size of the liquid droplets are below a predefined value. Otherwise the gas velocity and liquid velocities can be estimated using either stoke equations or by adding a differential pressure sensor and/or transit time or Doppler effect ultrasonic sensors. For instance, in case of high GVF, it is unknown that the gas velocity and liquid velocity are same if the Stokes number, Stk, is much less than 1:

$$Stk = t_0 u_0 / l_0 \text{ with: } t_0 = \rho_P d^2_P / (18 \mu_g) \quad \text{(Equation 11)}$$

where $u_0$ and $l_0$ are the characteristic velocity and length of the fluid while $\rho_p$, $d_p$ and $\mu_g$ are the density, particle size of transported phase, and the viscosity of the transporting fluid respectively.

Regarding the gas-liquid fraction, it can be determined by measuring the amount of absorption of THz waves in the THz image. In case of very low water-cut, the THz waves can penetrate more easily into the flow and depending on the gas-liquid fraction, either transit time ultrasonic sensor and/or a pressure sensor can be used.

Figure 8:
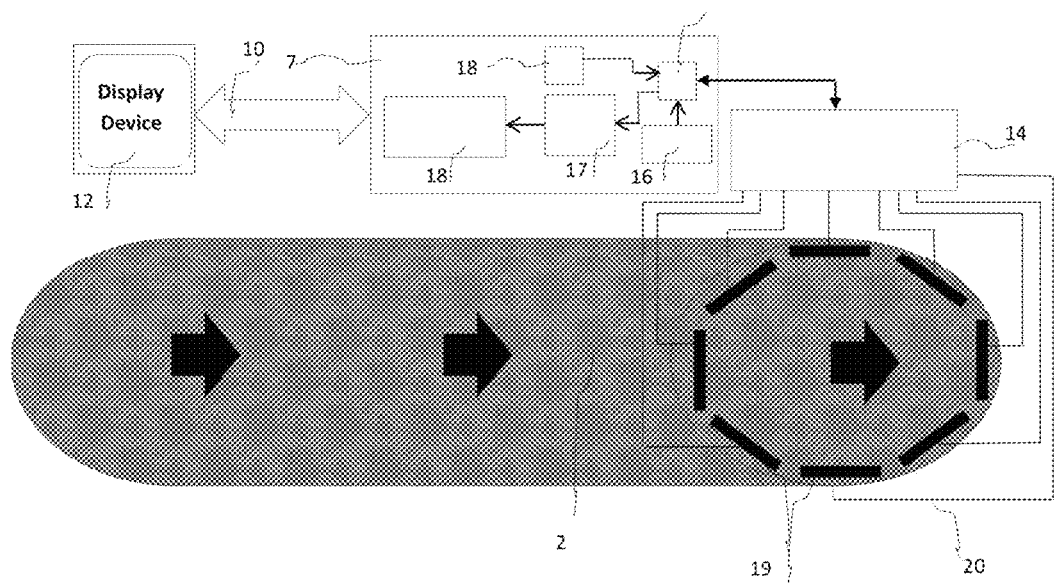
FIG. 8: a schematic illustration of an imaging system according to a further embodiment of the present invention.

Similarly, FIG. 8 shows another embodiment of the invention, according to which the imaging system comprises an ultrasonic array imaging system, but works without flow conditioner. The imaging system is inserted into a pipeline carrying a multiphase flow. This arrangement is adequate in case of a relatively very high void fraction with very low GVF. Assume that within a path of length $L_{Total}$, the overall length of the water phase is $L_{Water}$, and that of oil is $L_{Oil}$. Then, the water-cut, WC, can be determined as follows:

$$WC = (L_{Water})/(L_{Total}) = (2t - v_{Oil} L_{Total})/[(L_{Total})*(v_{Water} - v_{Oil})] \quad \text{(Equation 12)}$$

where t is the transit time of the ultrasonic wave, $v_{Oil}$ is the speed of ultrasonic waves in oil, and $v_{Water}$ the speed of ultrasonic waves in water.

Figure 9A:
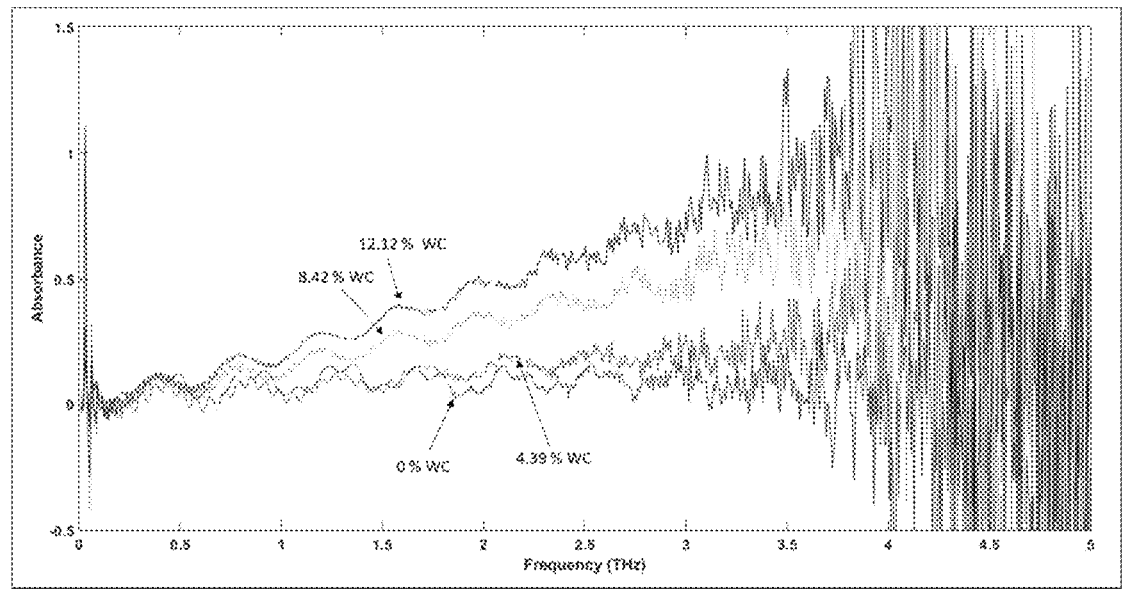
FIG. 9a, b: THz spectrum data for different amounts of water-cuts (a) and corresponding Principal Component Analysis (PCA) plot (b) according to an embodiment of the present invention.
Figure 9B:
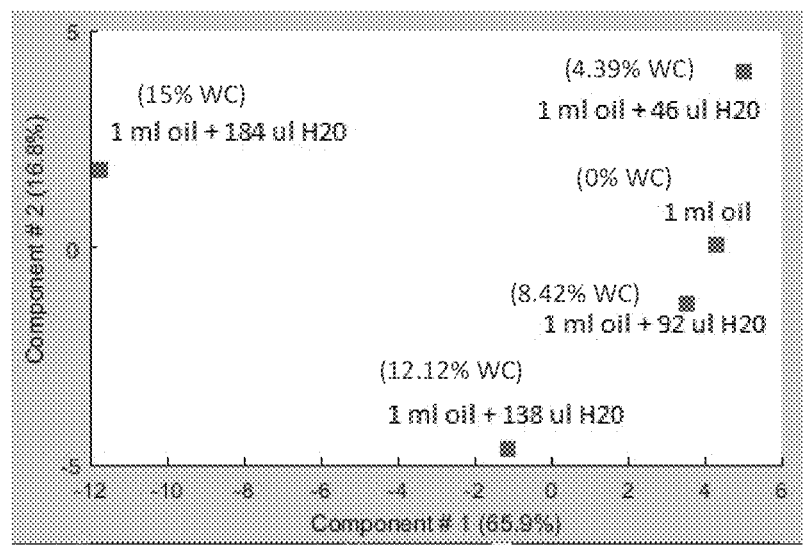

FIG. 9(a) shows the THz spectrum absorption for different concentrations of water-cut while FIG. 9(b) shows the corresponding principal component analysis (PCA) plot. It can be observed that THz waves can easily discriminate various amounts of water-cut. The absorption coefficient of the THz waves of frequency, $f_0$, by a medium of complex permittivity $\hat{\varepsilon}$ can be expressed by the following equation:

$$\alpha(\hat{\varepsilon}) = \frac{4\pi f_0}{c} imag(\hat{\varepsilon})$$ (Equation 13)

It should be appreciated that the absorption spectrum in NIR range exhibits much narrower frequency band of absorbance wavelength which requires a high resolution of the emitter and receiver alike, as compared to THz range. This constitutes a significant advantage of THz imaging.

From the suggested embodiments illustrated in FIG. 1 to FIG. 11, it can be deduced that the proposed device does not require pipeline restriction to measure the flow rate which is the case of other multiphase flow meters using for instance a venturi, orifice, or v-cone meters. Consequently, all disadvantages associated to these devices are avoided (e.g. significant pressure drop, requirement of pre-knowledge of the exact total density of the fluid, and preconditioning of the flow to transform it into turbulent flow). Accurate temperature sensors, not represented in the above Figures shall also be considered in order to compensate for temperature variations which may affect the propagation speed of the ultrasonic and THz waves.

Figure 10:
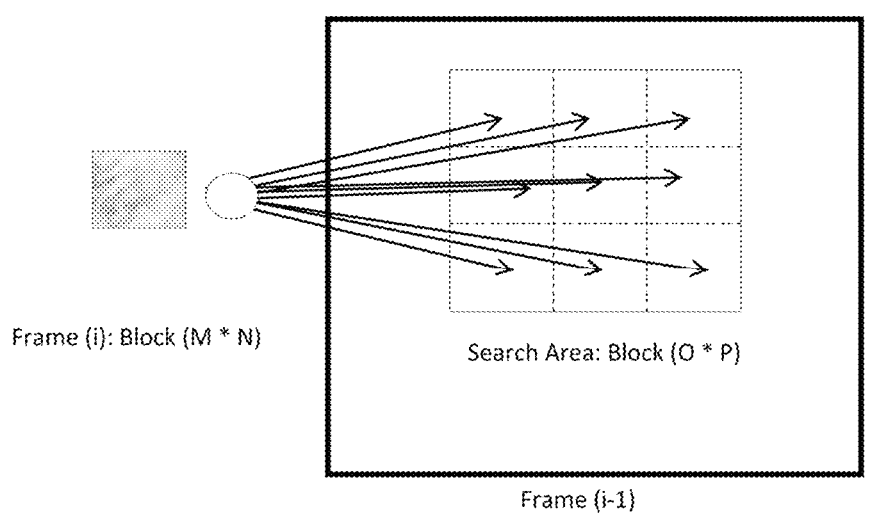
FIG. 10: a schematic illustration of a block-based motion estimation algorithm according to an embodiment of the present invention.

FIG. 10 shows the principle of block-based motion estimation algorithm which can be used to estimate the two-dimensional velocity field of the liquid bubbles. Two consecutive THz frames, i−1 and i, acquired in two consecutive time slots are stored in the frame buffer of the data processing module 9 (FIG. 1). Each of the frames is divided into image blocks of size (M×N) pixels. Each of these blocks, p, in the frame i−1 is then compared to blocks of same size in the frame i within a search area of size (O×P) blocks. The best match corresponding to the lowest distance between blocks indicate the two-dimensional velocity of liquid bubbles belonging to the block p of the frame i−1. Similarly, a region based motion estimation algorithm can also be performed by first segmenting the THz images to identify the regions corresponding to liquid bubbles in both frames i and i−1. This is followed by searching for each region in frame i−1 the best correlated region in frame i.

Figure 11:
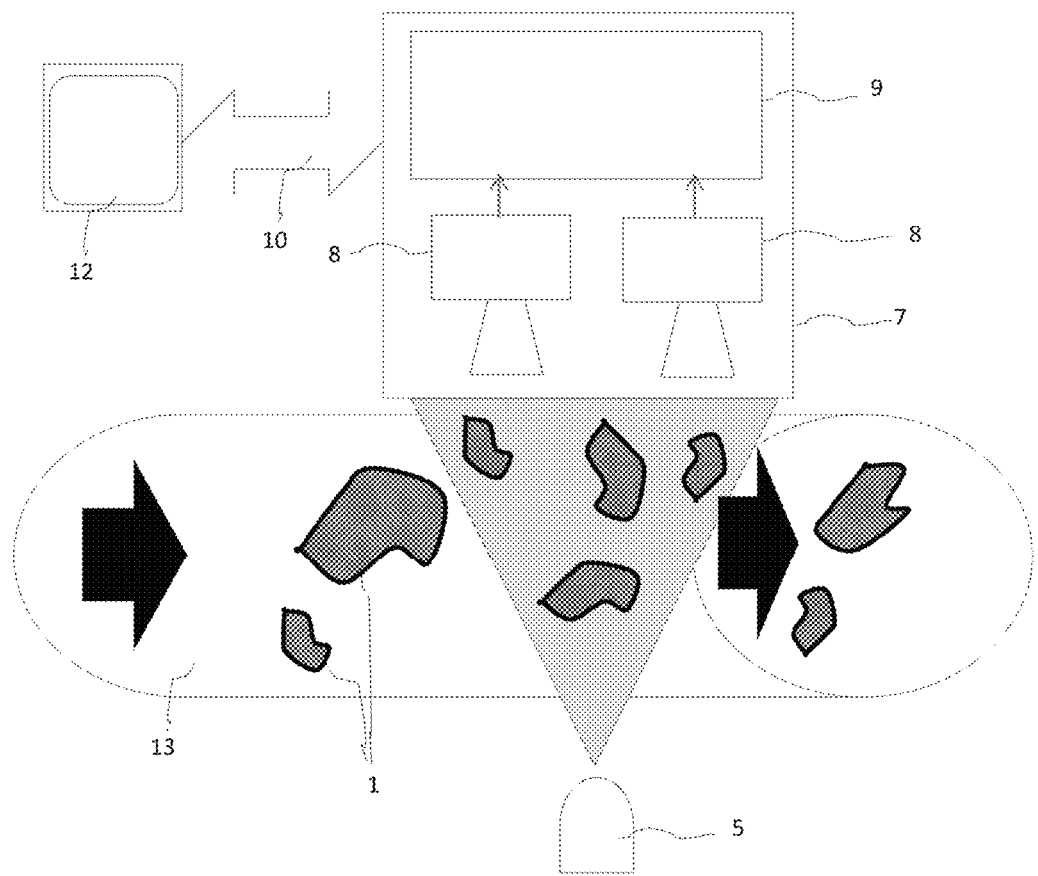
FIG. 11: a schematic block diagram to extract three-dimensional information of the flow using two THz cameras according to an embodiment of the present invention.

A three-dimensional image capture of the fluid can be acquired by using two or more THz cameras, instead of one single THz camera and then proceeds by a 3D reconstruction of the fluid profile using stereovision or other 3D reconstruction techniques. This is shown in FIG. 11. Real-time performance can be achieved using dedicated multiprocessing hardware architecture based on DSP processors or FPGAs. The same arrangement can also be used for two-dimensional image reconstruction which may be more accurate than in the case of using one single camera.

Figure 12:
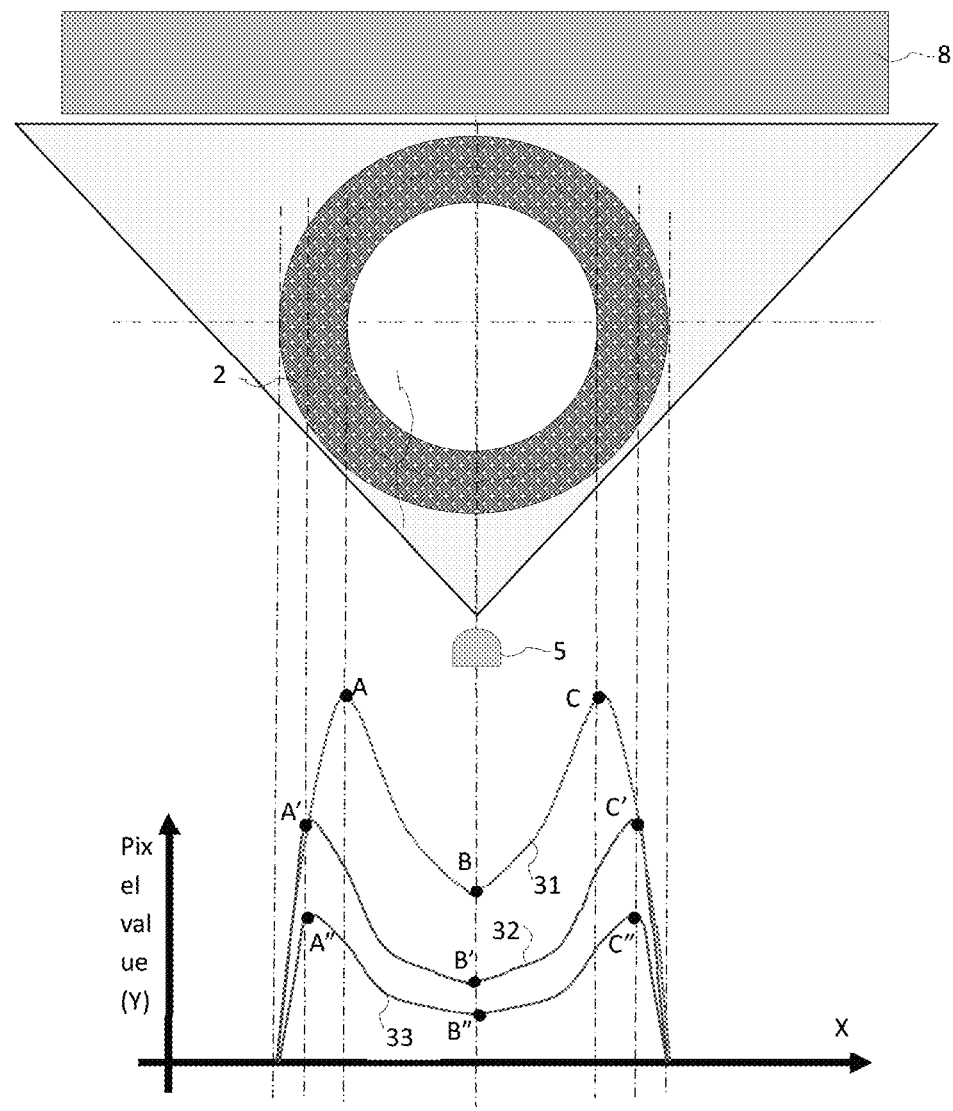
FIG. 12a-c: plots corresponding to pixel value distribution along a given row of the THz camera for an annular flow (a), an annular flow with scale deposit (b), and stratified flow (c) according to an embodiment of the present invention.
Figure 12:
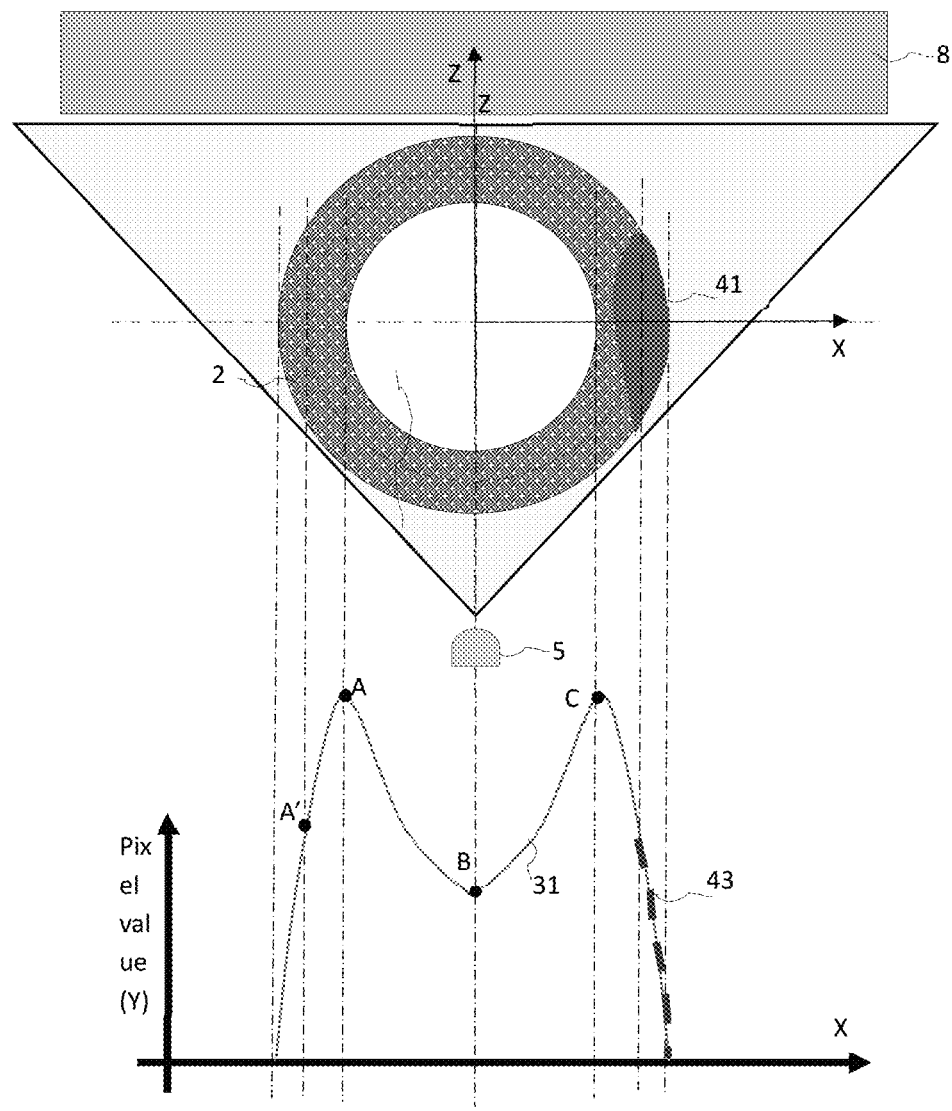
Figure 12:
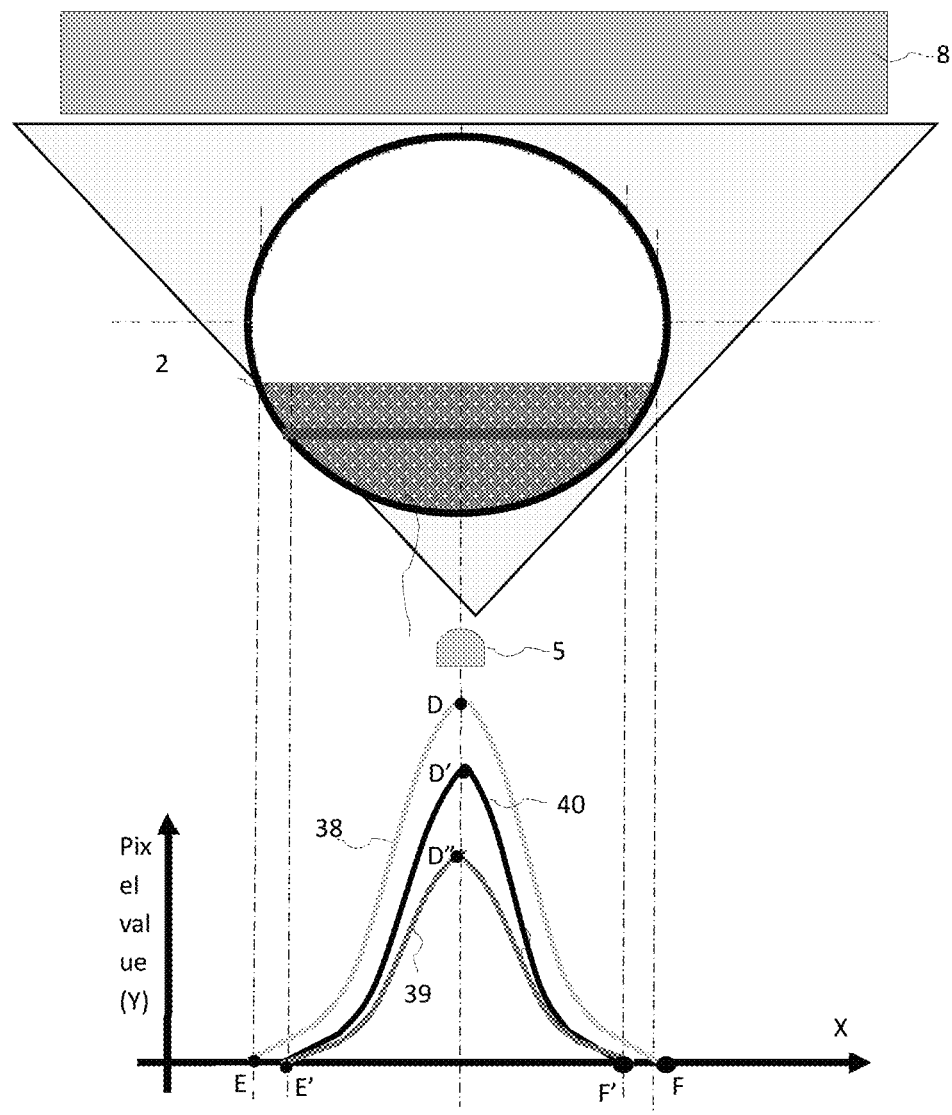

FIG. 12 shows the theoretical profile of THz wave absorption, represented by pixel value Y, within a given row of the camera for the case of an annular flow (FIG. 12(a) and FIG. 12(b)) and stratified flow (FIG. 12(c)). In FIG. 12(a), the plots 31 and 32 correspond to two different multiphase flows with different GVF and same water-cut, while plots 32 and 33 correspond to same GVF but two different water-cut). It can be observed that within a given row of the image, the pixel corresponding to the middle of the cross section of the pipeline would exhibits a minimum absorption B, B', and B" (since this corresponds to the minimum thickness of the liquid layer), while within the liquid-gas interface, a maximum absorption A, A', and A" can be observed. FIG. 12(b) corresponds to the case where a buildup 41 is formed on the right inner wall of the probe. In this case, the pixels values at a given row of the THz camera would follow the profile 43 which has the following equation:

$$Y = K \cdot Z = K \cdot (R^2 - X^2)^{0.5}$$ (Equation 14)

where K is a constant which depends on the power of the THz source, R the radius of the probe and Z the vertical coordinate. In case series of adjacent pixels, X, of a given row have a pixel value Y given in Equation 14 above for a given number of frames, then the corresponding zone may consist of a build-up substance.

The same principle can be used for the detection of build-up substances which may appear on the top or bottom side of the pipeline by providing a THz camera and THz source along the X axis of the frame represented in FIG. 12(b). Similarly, the ultrasonic array imaging system can easily detect the thickness of the buildup using equation 14 with a different constant K, which depends on the velocity of the ultrasonic waves onto the medium.

Figure 13:
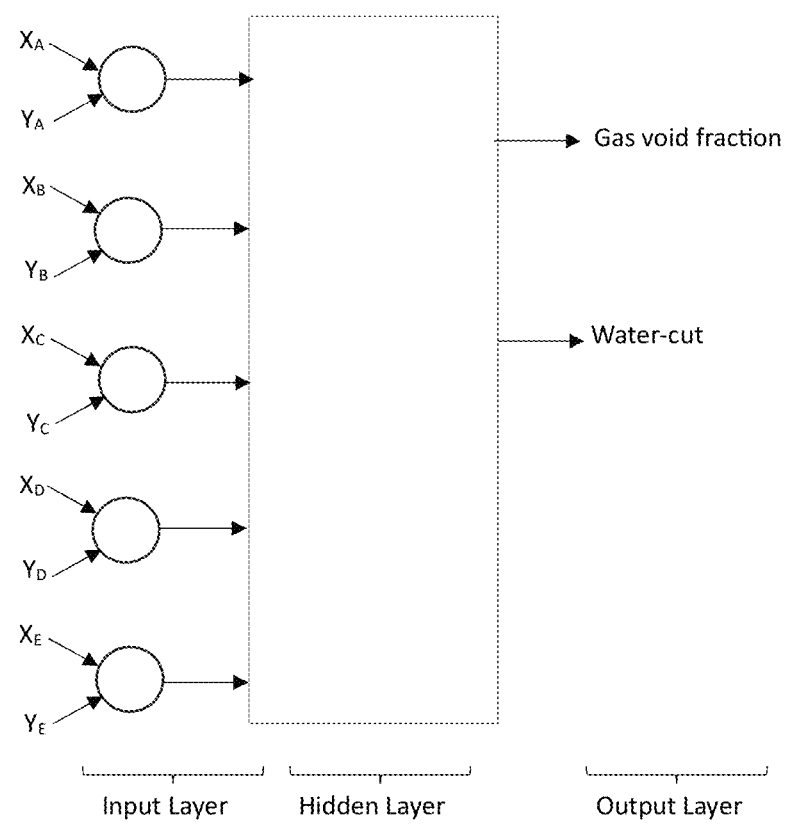
FIG. 13: a schematic structure of a possible pattern recognition algorithm according to an embodiment of the present invention.

FIG. 12(c), shows the case of the stratified flow where the plots 38 and 39 correspond to two different multiphase flows with different GVF and same water-cut, while plots 39 and 40 correspond to same GVF but two different water-cut). Using some well know pattern recognition algorithms (such as neural network algorithm shown in FIG. 13), both the GVF and water-cut of the multiphase flow can be determined.

Figure 14:
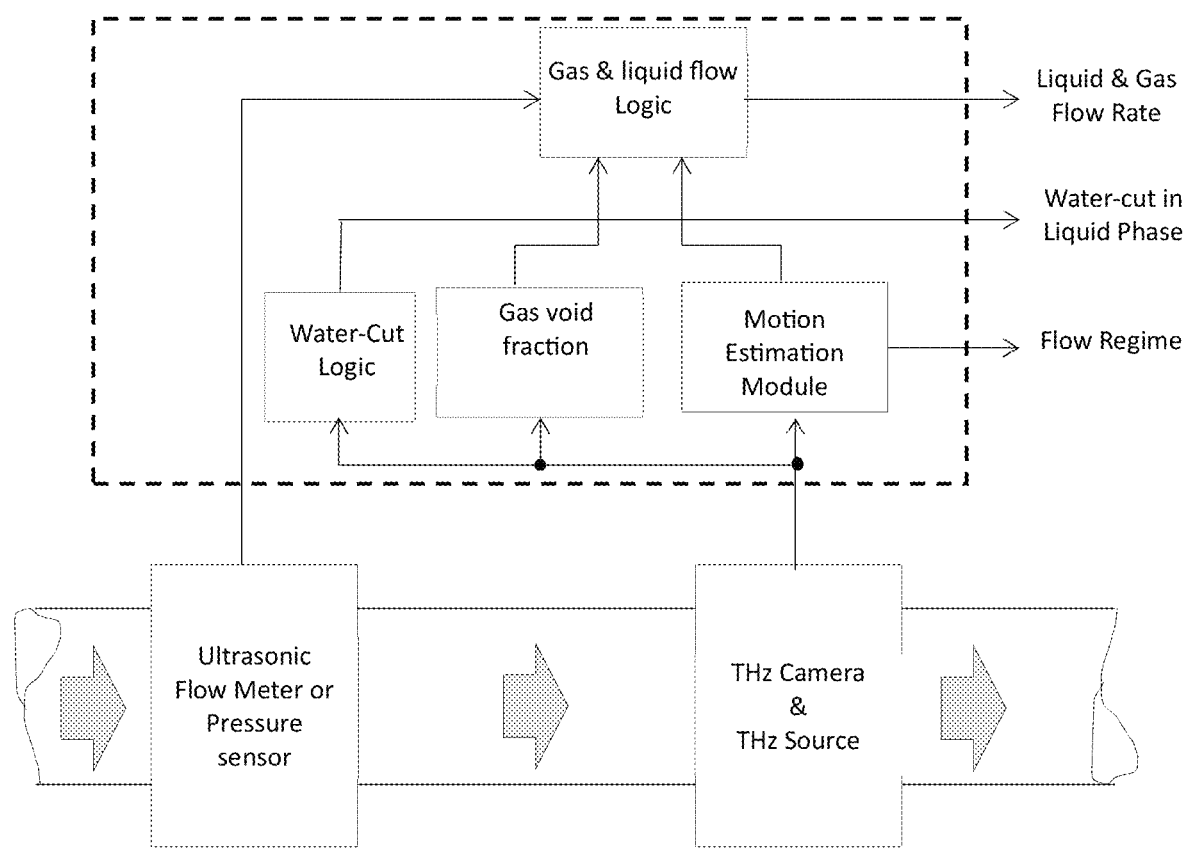
FIG. 14: a schematic algorithm of a THz-based imaging system according to an embodiment of the present invention.

FIG. 14 represents a possible embodiment of the overall software architecture of the suggested device. The ultrasonic sensors are used to determine the gas and liquid velocities, while the THz imaging subsystem allows determining the liquid/gas fraction, the water-cut, and the motion vector field.

The invention claimed is:

1. An imaging system for measuring flow rates of the individual phases of a multiphase flow having at least a gaseous phase and a liquid phase, and for providing images of the multiphase flow,
    wherein the imaging system is adapted to also measure the thickness of deposits on the internal wall of a pipe and includes an ultrasonic array imaging system having one or more rings of ultrasonic elements, and wherein the ultrasonic array imaging system operates in transit and/or reflection mode adapted to determine the thickness of a gas phase and a water-cut value, and to perform image reconstruction using a tomography technique.

2. The imaging system of claim 1, wherein wherein the liquid phase comprises water and/or oil.

3. The imaging system of claim 1, further comprising an online flow conditioner.

4. The imaging system of claim 3, wherein the online flow conditioner generates annular flow or stratified flow.

5. The imaging system of claim 3, wherein the online flow conditioner is a swirl separator or cyclone separator.

6. The imaging system of claim 3, wherein the online flow conditioner is positioned upstream of the imaging system.

7. The imaging system of claim 1, comprising a THz imaging system, wherein the THz imaging system is adapted to measure multiphase flows of gas void fractions above a predefined value.

8. The imaging system of claim 7, wherein the THz imaging system comprises a THz source and a THz camera, which capture a THz image reflecting the permittivity of the multiphase flow within the vicinity of the THz camera.

9. The imaging system of claim 8, wherein the THz image is processed by performing block-based motion estimation or region-based motion estimation to provide an image of the multiphase flow, the GVF, the water-cut, the density, and/or the velocity of the liquid-gas interface, which is the average between the gas velocity and the liquid velocity.

10. The imaging system of claim 8, wherein the THz imaging system comprises two or more THz cameras and/or two or more THz sources adapted to perform three-dimensional reconstruction of the multiphase flow and/or to perform an accurate two-dimensional image reconstruction.

11. The imaging system of claim 8, wherein the at least one THz camera comprises one or more pixels.

12. The imaging system of claim 1, further comprising one or more pairs of ultrasonic sensors which operate in transit time mode and/or Doppler-effect mode adapted to measure the flow rates of the multiphase flow, wherein the one or more pairs of ultrasonic sensors are adapted to be inserted into the multiphase flow.

13. The imaging system of claim 12, wherein at least one pair of the one or more pairs of ultrasonic sensors is arranged such that in operation, the ultrasonic waves propagate through the liquid.

14. The imaging system of claim 1, wherein the one or more rings of ultrasonic elements are arranged as a circular array.

15. The imaging system of claim 1, further comprising one or more pressure sensors adapted to measure the flow rates of the multiphase flow.

16. A method of using the imaging system according to claim 1, comprising one or more of the steps of measuring flow rates of a multiphase flow, visualizing the flow of the multiphase flow, and measuring the thickness of deposits on the internal wall of a pipe.

17. The method according to claim 16, wherein the step of measuring flow rates of the multiphase flow includes measuring flow rates of a multiphase flow having one or more of a low gas-void-fraction and a high water-cut.

18. A method for analyzing a multiphase flow flowing through a pipe using the imaging system according to claim 1 comprising the steps of:
  determining the flow rates of the individual phases of the multiphase flow;
  acquiring a two-dimensional or three-dimensional image of the flow of the multiphase flow; and
  measuring the thickness of scale which is deposited at the internal wall of the pipe.

19. The method of claim 18, wherein the multiphase flow comprises at least a gaseous phase and a liquid phase, and wherein the liquid phase comprises water and/or oil.

* * * * *